(12) United States Patent
Momma et al.

(10) Patent No.: US 10,454,093 B2
(45) Date of Patent: Oct. 22, 2019

(54) FABRICATING METHOD AND FABRICATING APPARATUS FOR SECONDARY BATTERY

(71) Applicant: SEMICONDUCTOR ENERGY LABORATORY CO., LTD., Atusgi-shi, Kanagawa-ken (JP)

(72) Inventors: Yohei Momma, Kanagawa (JP); Junpei Momo, Kanagawa (JP); Minoru Takahashi, Nagano (JP); Takahiro Kawakami, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 14/789,174

(22) Filed: Jul. 1, 2015

(65) Prior Publication Data

US 2016/0006017 A1   Jan. 7, 2016

(30) Foreign Application Priority Data

Jul. 4, 2014   (JP) .................. 2014-138755

(51) Int. Cl.
| | |
|---|---|
| *H01M 4/04* | (2006.01) |
| *H01M 4/13* | (2010.01) |
| *H01M 10/05* | (2010.01) |
| *H01M 4/139* | (2010.01) |
| *H01M 10/058* | (2010.01) |

(52) U.S. Cl.
CPC ....... *H01M 4/0459* (2013.01); *H01M 4/0442* (2013.01); *H01M 4/0445* (2013.01); *H01M 4/139* (2013.01); *H01M 4/0438* (2013.01); *H01M 10/058* (2013.01)

(58) Field of Classification Search
CPC ............ H01M 4/0459; H01M 4/0442; H01M 4/0445; H01M 4/139; H01M 4/0438; H01M 10/058
See application file for complete search history.

(56) References Cited

U.S. PATENT DOCUMENTS 3,928,152 A * 12/1975 Harvey .................. C25C 1/12
                                                        205/576
4,764,853 A     8/1988 Thomas et al.
(Continued)

FOREIGN PATENT DOCUMENTS

EP        0629011 A     12/1994
JP        06-243868 A   9/1994
(Continued)

*Primary Examiner* — Ciel P Thomas
(74) *Attorney, Agent, or Firm* — Nixon Peabody LLP; Jeffrey L. Costellia

(57) ABSTRACT

To provide a fabricating method and a fabricating apparatus for a lithium-ion secondary battery having stable charge characteristics and lifetime characteristics. A positive electrode is subjected to an electrochemical reaction in a large amount of electrolytic solution in advance before a secondary battery is completed. In this manner, the positive electrode can have stability. The use of the positive electrode enables fabrication of a highly reliable secondary battery. Similarly, a negative electrode is subjected to an electrochemical reaction in a large amount of electrolytic solution in advance. The use of the negative electrode enables fabrication of a highly reliable secondary battery.

20 Claims, 10 Drawing Sheets

(56) References Cited

U.S. PATENT DOCUMENTS

| | | | |
|---|---|---|---|
| 4,801,363 A * | 1/1989 | Gregory | C25D 3/42 |
| | | | 205/234 |
| 5,677,084 A | 10/1997 | Tsukamoto et al. | |
| 5,721,067 A * | 2/1998 | Jacobs | H01M 4/0447 |
| | | | 429/220 |
| 6,134,902 A | 10/2000 | Curry | |
| 6,432,585 B1 * | 8/2002 | Kawakami | C23C 18/31 |
| | | | 429/209 |
| 7,179,561 B2 | 2/2007 | Niu et al. | |
| 7,745,047 B2 | 6/2010 | Zhamu et al. | |
| 7,842,432 B2 | 11/2010 | Niu et al. | |
| 7,939,218 B2 | 5/2011 | Niu | |
| 7,977,007 B2 | 7/2011 | Niu et al. | |
| 7,977,013 B2 | 7/2011 | Niu et al. | |
| 8,278,011 B2 | 10/2012 | Zhu et al. | |
| 8,884,845 B2 | 11/2014 | Yamazaki et al. | |
| 2005/0079423 A1 | 4/2005 | Matsubara et al. | |
| 2007/0295718 A1 | 12/2007 | Takei et al. | |
| 2008/0254296 A1 | 10/2008 | Handa et al. | |
| 2008/0261112 A1 | 10/2008 | Nagata et al. | |
| 2009/0045680 A1 | 2/2009 | Litch et al. | |
| 2009/0070988 A1 | 3/2009 | Honda et al. | |
| 2009/0123850 A1 | 5/2009 | Takeuchi et al. | |
| 2010/0035093 A1 | 2/2010 | Ruoff et al. | |
| 2010/0081057 A1 | 4/2010 | Liu et al. | |
| 2010/0143798 A1 | 6/2010 | Zhamu et al. | |
| 2010/0176337 A1 | 7/2010 | Zhamu et al. | |
| 2010/0248034 A1 | 9/2010 | Oki et al. | |
| 2010/0310941 A1 | 12/2010 | Kumta et al. | |
| 2010/0330421 A1 | 12/2010 | Cui et al. | |
| 2011/0012067 A1 | 1/2011 | Kay | |
| 2011/0111303 A1 | 5/2011 | Kung et al. | |
| 2011/0121240 A1 | 5/2011 | Amine et al. | |
| 2011/0159372 A1 | 6/2011 | Zhamu et al. | |
| 2011/0229795 A1 | 9/2011 | Niu et al. | |
| 2011/0244328 A1 | 10/2011 | Iriyama et al. | |
| 2011/0291240 A1 | 12/2011 | Yamazaki | |
| 2011/0292564 A1 | 12/2011 | Yamazaki | |
| 2012/0171542 A1 | 7/2012 | Matsumoto et al. | |
| 2013/0017443 A1 | 1/2013 | Yamazaki | |
| 2013/0065116 A1 * | 3/2013 | Ogihara | H01M 4/134 |
| | | | 429/207 |
| 2013/0067726 A1 * | 3/2013 | Kuriki | H01M 10/052 |
| | | | 29/623.1 |
| 2014/0027291 A1 * | 1/2014 | Vidal | H01M 4/13 |
| | | | 205/59 |
| 2014/0315085 A1 * | 10/2014 | Norton | H01M 4/1395 |
| | | | 429/219 |
| 2016/0111710 A1 | 4/2016 | Momo et al. | |

FOREIGN PATENT DOCUMENTS

| | | | |
|---|---|---|---|
| JP | 08-255635 A | 10/1996 | |
| JP | 10-223259 A | 8/1998 | |
| JP | 2002-093411 A | 3/2002 | |
| JP | 2005-157317 A | 6/2005 | |
| JP | 2006-190556 A | 7/2006 | |
| JP | 2006-216451 A | 8/2006 | |
| JP | 2008-098155 A | 4/2008 | |
| JP | 2009-076372 A | 4/2009 | |
| JP | 2013-069418 A | 4/2013 | |
| JP | WO 2013171991 A1 * | 11/2013 | H01M 4/0445 |

* cited by examiner

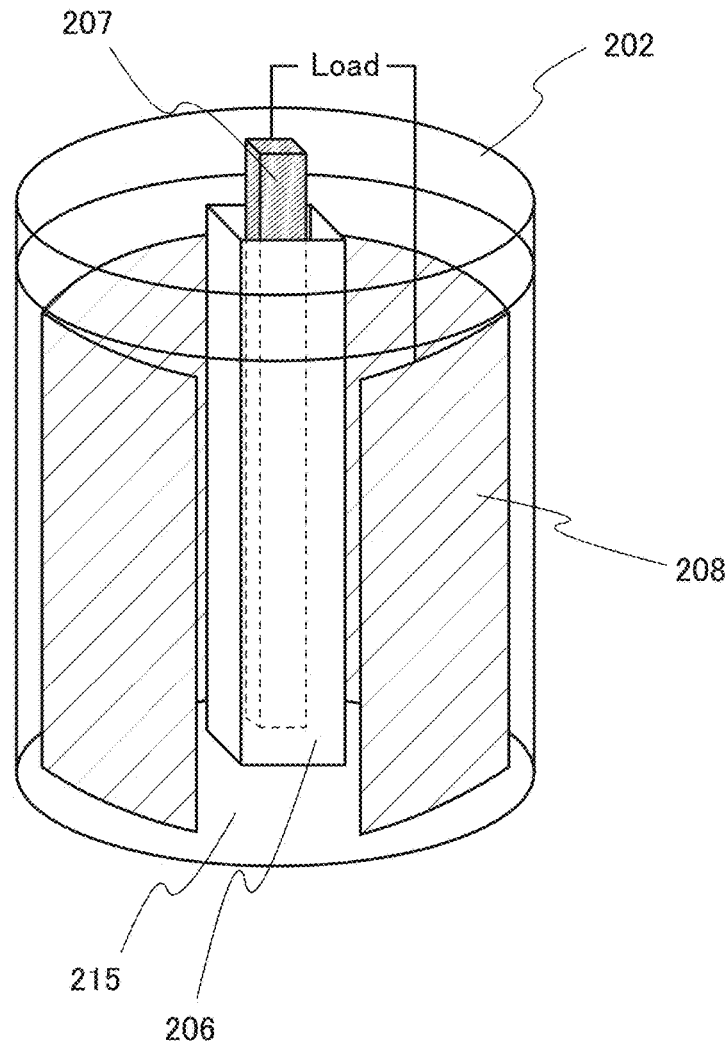

FABRICATING METHOD AND FABRICATING APPARATUS FOR SECONDARY BATTERY

BACKGROUND OF THE INVENTION

1. Field of the Invention

The present invention relates to an object, a method, or a manufacturing method. The present invention relates to a process, a machine, manufacture, or a composition of matter. One embodiment of the present invention relates to a semiconductor device, a display device, a light-emitting device, a power storage device, a driving method therefor, or a manufacturing method therefor. In particular, one embodiment of the present invention relates to a fabricating apparatus for a secondary battery.

Note that electronic devices in this specification mean all devices including secondary batteries, and electro-optical devices including secondary batteries, information terminal devices including secondary batteries, vehicles including secondary batteries, and the like are all electronic devices.

2. Description of the Related Art

In recent years, portable information terminals typified by smartphones have been actively developed. Portable information terminals, which are a kind of electronic devices, are desired to be lightweight and compact by users.

Patent Document 1 discloses an example of a hands-free wearable device with which information can be visually obtained anywhere, specifically, a google-type display device that includes a CPU and is capable of data communication. The device disclosed in Patent Document 1 is also a kind of electronic device.

Most wearable devices and portable information terminals include secondary batteries (also referred to as batteries) that can be repeatedly charged and discharged, and have problems in that there is a limitation on the time for operation of the wearable devices and the portable information terminals because their light weight and compactness limit the battery capacity. Secondary batteries used in wearable devices and portable information terminals should be lightweight and should be able to be used for a long time.

Examples of secondary batteries include a nickel-metal hydride battery and a lithium-ion secondary battery. In particular, lithium-ion secondary batteries have been actively researched and developed because the capacity thereof can be increased and the size thereof can be reduced.

Electrodes serving as positive electrodes or negative electrodes of lithium-ion secondary batteries are each formed using, for example, metal lithium, a carbon-based material, or an alloy-based material. Lithium-ion secondary batteries are divided into lithium metal batteries, lithium-ion secondary batteries, and lithium polymer secondary batteries according to the kind of electrolyte. Furthermore, batteries are divided into thin (laminated) batteries, cylindrical batteries, coin-type batteries, and rectangular batteries according to the kind of an exterior material in which electrodes and an electrolyte are packed.

Patent Document 2 discloses a fabricating method for a lithium-ion secondary battery that improves cycle performance by using an alloy-based material (e.g., silicon) with increased reactivity with lithium for a negative electrode active material.

REFERENCE

[Patent Document 1] Japanese Published Patent Application No. 2005-157317

[Patent Document 2] Japanese Published Patent Application No. 2013-69418

SUMMARY OF THE INVENTION

A lithium-ion secondary battery using an electrolytic solution is fabricated by surrounding a positive electrode (e.g., a lithium-containing oxide material), a negative electrode (e.g., carbon), and another member with an exterior material, introducing the electrolytic solution in a surrounded region, and sealing the exterior material. After that, the fabricated lithium-ion secondary battery is subjected to the first charge. Alternatively, before sealing, the first charge is performed.

In the first charge, which is also called the initial charge, a chemical reaction might occur at the interface with an electrode and/or the interface with an electrolytic solution, generating a gas. Furthermore, lithium ions released from a lithium-containing oxide material are transferred to and inserted into a negative electrode. When lithium reacts with carbon in the negative electrode at this time, a thin film of $Li_2O$ or the like is formed on a surface of carbon. This thin film might affect the transfer of lithium ions and the like, leading to a change in the characteristics of a battery.

A fabricating method and a fabricating apparatus for a lithium-ion secondary battery having stable charge characteristics and lifetime characteristics are provided.

An object of one embodiment of the present invention is to provide a novel power storage device, a novel secondary battery, or the like. Note that the descriptions of these objects do not disturb the existence of other objects. In one embodiment of the present invention, there is no need to achieve all the objects. Other objects will be apparent from and can be derived from the descriptions of the specification, the drawings, the claims, and the like.

In view of the above, during fabrication of a secondary battery, a positive electrode is subjected to an electrochemical reaction in an abundance of electrolytic solution to sufficiently form a reaction product in advance, typically generate a gas. Then, the secondary battery is fabricated using the positive electrode.

Not only in the initial charge, but whenever a gas is generated in a secondary battery, a sealed region expands and thus the secondary battery expands, which might degrade the characteristics of the battery.

A positive electrode is subjected to an electrochemical reaction in a large amount of electrolytic solution in advance before a secondary battery is completed. In this manner, the positive electrode can have stability. The use of the positive electrode enables fabrication of a highly reliable secondary battery. The initial charge also changes part of the quality of the large amount of electrolytic solution. Not this large amount of electrolytic solution containing the reaction product but a small amount of electrolytic solution prepared separately is used in fabricating a secondary battery. The positive electrode subjected to the initial charge is unlikely to react with the small amount of electrolytic solution and hardly form a reaction product.

Like the positive electrode, a negative electrode is subjected to an electrochemical reaction in an electrolytic solution before the secondary battery is completed, whereby the negative electrode can have stability.

A fabricating apparatus for a secondary battery disclosed in this specification includes a container, an electrolytic solution in the container, a first electrode for an electrochemical reaction in the electrolytic solution, a first cord electrically connected to the first electrode, and a second cord electrically connected to a second electrode including an active material layer. The first cord and the second cord are electrically connected to a device for controlling reduction conditions or oxidation conditions.

The fabricating apparatus further includes a means for stirring the electrolytic solution in the container. Stirring can promote an electrochemical reaction (oxidation or reduction) to reduce treatment time. The means for stirring the electrolytic solution in the container includes, for example, a pump that discharges an argon gas in the form of bubbles in the container of the fabricating apparatus. Alternatively, the means for stirring the electrolytic solution in the container may be a magnet stirrer, and a mechanism that rotates the magnet stirrer may be provided at the bottom of the container.

Furthermore, to shorten treatment time by promotion of an electrochemical reaction (oxidation or reduction), a means for heating the electrolytic solution in the container (e.g., a heater) may be provided.

The fabricating apparatus further includes an exhaust means for exhausting a gas in the container. The exhaust means preferably exhausts a gas from the hermetically-closed apparatus with the use of a fan. For example, the hermetically-closed apparatus is maintained at a pressure of approximately 0.5 atmospheres.

Alternatively, a batch-type apparatus may be employed to perform treatment on a plurality of electrodes. In that case, more than one second cord that is electrically connected to the second electrode is provided so that more than one second electrode is subjected to reduction or oxidation at a time in the electrolytic solution in the fabricating apparatus.

A fabricating method for a secondary battery using an electrode formed with the above fabricating apparatus for one or both of electrodes is also one embodiment of the present invention. The fabricating method for a secondary battery includes the steps of forming a first electrode including a positive electrode active material layer; forming a second electrode including a negative electrode active material layer; performing electrochemical reduction or oxidization on the first electrode or the second electrode put in an electrolytic solution in a container by supplying a current in the electrolytic solution with the electrode used as one electrode; taking out the first electrode or second electrode that has been subjected to the electrochemical reaction from the electrolytic solution in the container and drying the first electrode or second electrode; packing a stack formed of the first electrode and the second electrode in a region surrounded by an exterior body having an opening; introducing the electrolytic solution in the region surrounded by the exterior body; and closing the opening of the exterior body.

In the above fabricating method, the electrolytic solution contains lithium, and the electrode subjected to the electrochemical reaction is lithium foil.

The aforementioned fabricating apparatus can be efficiently used when a material with high irreversible capacity is used for a positive electrode or a negative electrode. Thus, the use of the fabricating apparatus allows fabrication of a secondary battery that can be used with minimum wastage of a material for an electrode active material.

Here, reversible capacity and irreversible capacity will be described below.

The standard electrode potential (equilibrium potential) of lithium is as very low as −3.045 V (vs. SHE) at which, for example, many organic solvents are reduced and decomposed in a negative electrode. However, in the case of some organic solvents, reductive decomposition allows a decomposition product to collect on a surface and form a film, which inhibits further decomposition of the organic solvent. As the film is formed, the decomposition reaction of the electrolyte solution, which is an irreversible reaction, becomes less likely to occur than a reaction of lithium ions, which is a reversible reaction. Mainly during the initial charge and discharge, an irreversible reaction occurs and causes movement of electric charge, the amount of which equals the sum of those in the reversible reaction and the irreversible reaction.

During the initial charge, in addition to the reversible reaction due to release of lithium ions from a positive electrode, the irreversible reaction occurs and the amount of moving electric charge increases accordingly. The amount of moving electric charge involved in the irreversible reaction is referred to as irreversible capacity, and the amount of moving electric charge involved in the reversible reaction is referred to as reversible capacity. They collectively correspond to the initial charge capacity.

In contrast, during the initial discharge, although the reversible chemical reaction between lithium ions and the positive electrode occurs and causes movement of electric charge, movement of electric charge involved in the irreversible reaction does not occur. That is, the reversible capacity is the discharge capacity. Here, the ratio of the discharge capacity to the charge capacity is referred to as charge and discharge efficiency. Higher irreversible capacity means lower charge and discharge efficiency.

A material for a positive electrode active material is a factor that determines the irreversible capacity of the positive electrode and thus preferably has low irreversible capacity and high charge and discharge efficiency.

However, in many cases, as a material for a positive electrode active material has better cycle performance and higher capacity, its irreversible capacity is relatively higher and its charge and discharge efficiency is relatively lower. If a material having low charge and discharge efficiency is used for a positive electrode active material, movement of electric charge corresponding to irreversible capacity in addition to reversible capacity occurs during the initial charge. Here, in a battery reaction, the amount of electric charge in a positive electrode reaction is equal to the amount of electric charge in a negative electrode reaction. Hence, in a negative electrode, a larger amount of material for a negative electrode active material is needed because of the electric charge corresponding to the irreversible capacity in addition to the reversible capacity. This increases the mass and volume of the negative electrode, leading to lower battery capacity per unit mass and volume. Additionally, the increased amount of material for negative electrode active material does not contribute to a battery reaction during and after the second charge and discharge; this is wasteful of the material.

The same applies to a negative electrode. A high-capacity material for a negative electrode active material has relatively high irreversible capacity and low charge and discharge efficiency in many cases. Hence, in the case where a high-capacity material for a negative electrode active material is used in a negative electrode of a secondary battery, an extra amount of material for a positive electrode active material with capacity corresponding to the irreversible capacity is needed, since the amount of electric charge in a negative electrode reaction is equal to the amount of electric charge in a positive electrode reaction. This increases the mass and volume of the positive electrode, leading to lower battery capacity per unit mass and volume. The increased amount of material for a positive electrode active material does not contribute to a battery reaction; this is wasteful of the material.

One embodiment of the present invention can provide a secondary battery having a high electrode capacity, high-speed charge and discharge characteristics, and improved cycle performance.

One embodiment of the present invention can provide a fabricating apparatus and a fabricating method for a secondary battery having a small initial capacity loss. Furthermore, a lithium-ion battery that is fabricated with the fabricating apparatus has high cycle performance.

One embodiment of the present invention can provide a novel electrode, a novel secondary battery, or a novel power storage device. Note that one embodiment of the present invention is not limited to these effects.

BRIEF DESCRIPTION OF THE DRAWINGS

In the accompanying drawings:

FIG. 5 is an example of a schematic cross-sectional view of a fabricating apparatus of one embodiment of the present invention;

DETAILED DESCRIPTION OF THE INVENTION

Figure 1:
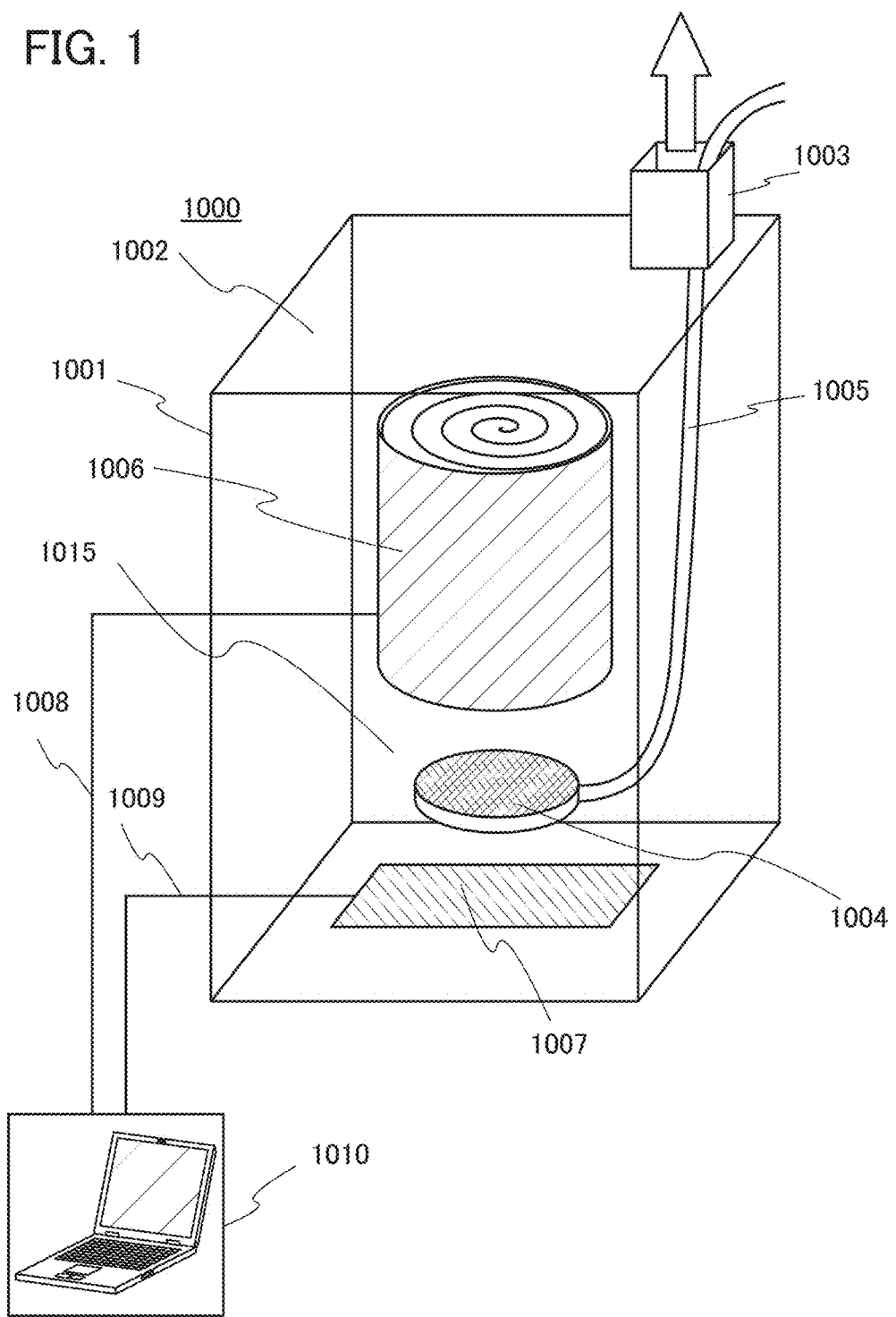
FIG. 1 is an example of a schematic cross-sectional view of a fabricating apparatus of one embodiment of the present invention.

Embodiments and examples of the present invention will be described below in detail with reference to the drawings. However, the present invention is not limited to the descriptions below, and it is easily understood by those skilled in the art that modes and details disclosed herein can be modified in various ways. Further, the present invention is not construed as being limited to the descriptions of the embodiments and the examples.

The term "electrically connected" includes the case where components are connected through an "object having any electric function". There is no particular limitation on the "object having any electric function" as long as electric signals can be transmitted and received between the components connected through the object.

The position, size, range, or the like of each component illustrated in drawings and the like is not accurately represented in some cases for simplification. Therefore, the disclosed invention is not necessarily limited to the position, size, range, or the like disclosed in the drawings and the like.

The ordinal number such as "first", "second", and "third" are used to avoid confusion among components.

(Embodiment 1)

In this embodiment, a fabricating method and a fabricating apparatus for an electrode for a secondary battery of one embodiment of the present invention will be described with reference to FIG. 1 and FIGS. 3A to 3F.

Figure 3A:
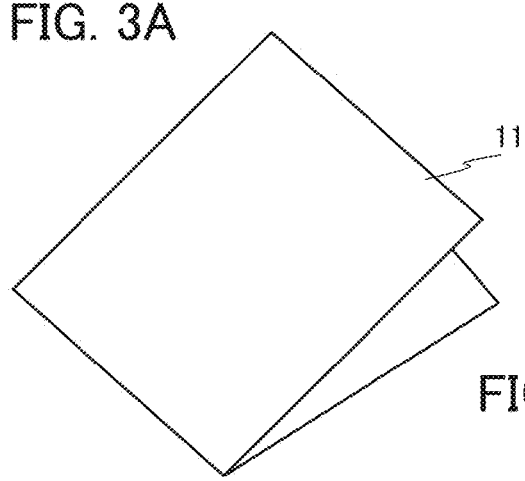
FIGS. 3A to 3F illustrate fabricating steps of a thin secondary battery of one embodiment of the present invention.

FIG. 3A is a perspective view of an external body 11. A sheet made of a flexible base material is prepared as the exterior body 11. As the sheet, a stack, a metal film provided with an adhesive layer (also referred to as a heat-seal layer) or sandwiched between adhesive layers is used. As the adhesive layer, a heat-seal resin film containing, e.g., polypropylene or polyethylene is used. In this embodiment, a metal sheet, specifically, aluminum foil whose top surface is provided with a nylon resin and whose bottom surface is provided with a stack including an acid-proof polypropylene film and a polypropylene film is used as the sheet. The sheet is cut to prepare the film-like exterior body 11 illustrated in FIG. 3A. The exterior body 11 is folded in half so that two end portions overlap each other, and is sealed on three sides with an adhesive layer.

The exterior body 11 is folded in half, whereby the state illustrated in FIG. 3A is produced.

Figure 3C:
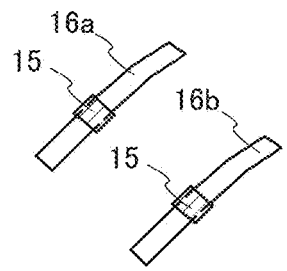
Figure 3B:
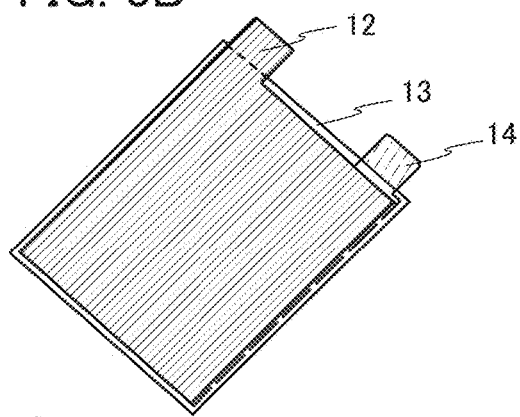

FIG. 3B is a perspective view illustrating a positive electrode, a separator 13, and a negative electrode that are stacked. The positive electrode includes at least a positive electrode current collector 12 and a positive electrode active material layer 18. The negative electrode includes at least a negative electrode current collector 14 and a negative electrode active material layer 19. Although the storage battery electrodes (the positive electrode and the negative electrode) in the shape of rectangular sheets are shown in FIG. 3B, the shape of the storage battery electrodes is not limited thereto and can be selected from other given shapes as appropriate. The active material layer is formed over only one surface of the current collector; however, active material layers may be formed so that the current collector is sandwiched therebetween. The active material layer is not necessarily formed over an entire surface of the current collector, and an uncoated region such as a region for connection to an electrode tab is provided as appropriate.

There is no particular limitation on the positive electrode current collector and the negative electrode current collector as long as they have high conductivity without causing a significant chemical change in a secondary battery. For example, the current collectors can be formed using a metal such as gold, platinum, iron, nickel, copper, aluminum, titanium, tantalum, or manganese, an alloy thereof (e.g., stainless steel). Furthermore, carbon, nickel, titanium, or the like can be used as a coating material. Furthermore, silicon, neodymium, scandium, molybdenum, or the like may be added to improve heat resistance. The current collectors can have any of various shapes including a foil-like shape, a sheet-like shape, a plate-like shape, a net-like shape, a cylindrical shape, a coil shape, a punching-metal shape, an expanded-metal shape, a porous shape, and a shape of non-woven fabric as appropriate. The current collectors may be formed to have micro irregularities on the surfaces thereof in order to enhance adhesion to active materials. The current collectors each preferably have a thickness of more than or equal to 5 μm and less than or equal to 30 μm.

As the active material used in the positive electrode or the negative electrode, a material into and from which carrier ions such as lithium ions can be inserted and extracted is used. The average diameter or diameter distribution of the active material particles can be controlled by crushing, granulation, and classification by an appropriate means.

Examples of positive electrode active materials that can be used for the positive electrode active material layer 18 include a composite oxide with an olivine structure, a composite oxide with a layered rock-salt structure, and a composite oxide with a spinel structure. Specifically, a compound such as $LiFeO_2$, $LiCoO_2$, $LiNiO_2$, $LiMn_2O_4$, $V_2O_5$, $Cr_2O_5$, or $MnO_2$ can be used.

Alternatively, a complex material ($LiMPO_4$ (general formula) (M is one or more of Fe(II), Mn(II), Co(II), and Ni(II))) can be used. Typical examples of the general formula $LiMPO_4$ which can be used as a material are lithium compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1, and 0<i<1).

Alternatively, a complex material such as $Li_{(2-j)}MSiO_4$ (general formula) (M is one or more of Fe(II), Mn(II), Co(II), and Ni(II); 0≤j≤2) may be used. Typical examples of the general formula $Li_{(2-j)}MSiO_4$ which can be used as a material are lithium compounds such as $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ (k+l≤1, 0<k<1, and 0<l<1), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ (m+n+q≤1, 0<m<1, 0<n<1, and 0<q<1), and $Li_{(2-j)}Fe_rNi_sCo_tMn_uSiO_4$ (r+s+t+u≤1, 0<r<1, 0<s<1, 0<t<1, and 0<u<1).

Still alternatively, a nasicon compound expressed by $A_xM_2(XO_4)_3$ (general formula) (A=Li, Na, or Mg, M=Fe, Mn, Ti, V, Nb, or Al, X=S, P, Mo, W, As, or Si) can be used for the positive electrode active material. Examples of the nasicon compound are $Fe_2(MnO_4)_3$, $Fe_2(SO_4)_3$, and $Li_3Fe_2(PO_4)_3$. Further alternatively, for example, a compound expressed by $Li_2MPO_4F$, $Li_2MP_2O_7$, or $Li_5MO_4$ (general formula) (M=Fe or Mn), a perovskite fluoride such as $NaF_3$ and $FeF_3$, a metal chalcogenide (a sulfide, a selenide, or a telluride) such as $TiS_2$ and $MoS_2$, an oxide with an inverse spinel structure such as $LiMVO_4$, a vanadium oxide ($V_2O_5$, $V_6O_{13}$, $LiV_3O_8$, or the like), a manganese oxide, or an organic sulfur compound can be used as the positive electrode active material.

In the case where carrier ions are alkali metal ions other than lithium ions, or alkaline-earth metal ions, a material containing an alkali metal (e.g., sodium and potassium) or an alkaline-earth metal (e.g., calcium, strontium, barium, beryllium, and magnesium) instead of lithium may be used as the positive electrode active material.

As the separator 13, an insulator such as cellulose (paper), polyethylene with pores, and polypropylene with pores can be used.

As an electrolyte of an electrolytic solution, a material in which carrier ions can be transferred and which contains lithium ions serving as carrier ions is used. Typical examples of the electrolyte are lithium salts such as $LiPF_6$, $LiClO_4$, $LiAsF_6$, $LiBF_4$, $LiCF_3SO_3$, $Li(CF_3SO_2)_2N$, and $Li(C_2F_5SO_2)_2N$. One of these electrolytes may be used alone, or two or more of them may be used in an appropriate combination and in an appropriate ratio.

As a solvent of the electrolytic solution, a material in which carrier ions can be transferred is used. As the solvent of the electrolytic solution, an aprotic organic solvent is preferably used. Typical examples of aprotic organic solvents include ethylene carbonate (EC), propylene carbonate, dimethyl carbonate, diethyl carbonate (DEC), γ-butyrolactone, acetonitrile, dimethoxyethane, tetrahydrofuran, and the like, and one or more of these materials can be used. When a gelled high-molecular material is used as the solvent of the electrolytic solution, safety against liquid leakage and the like is improved. Furthermore, the storage battery can be thinner and more lightweight. Typical examples of gelled high-molecular materials include a silicone gel, an acrylic gel, an acrylonitrile gel, a polyethylene oxide gel, a polypropylene oxide gel, a fluorine-based polymer gel, and the like. Alternatively, the use of one or more kinds of ionic liquids (room temperature molten salts) which have features of non-flammability and non-volatility as a solvent of the electrolytic solution can prevent the storage battery from exploding or catching fire even when the storage battery internally shorts out or the internal temperature increases owing to overcharging and others. An ionic liquid is a salt in the fluid state and has high ion mobility (conductivity). An ionic liquid contains a cation and an anion. Examples of ionic liquids include an ionic liquid containing an ethylmethylimidazolium (EMI) cation and an ionic liquid containing an N-methyl-N-propylpiperidinium ($PP_{13}$) cation.

Instead of the electrolytic solution, a solid electrolyte including an inorganic material such as a sulfide-based inorganic material or an oxide-based inorganic material, or a solid electrolyte including a high-molecular material such as a polyethylene oxide (PEO)-based high-molecular material may alternatively be used. When the solid electrolyte is used, a separator and a spacer are not necessary. Furthermore, the battery can be entirely solidified; therefore, there is no possibility of liquid leakage and thus the safety of the battery is dramatically increased.

A material with which lithium can be dissolved and precipitated or a material into and from which lithium ions can be inserted and extracted can be used for a negative electrode active material of the negative electrode active material layer 19; for example, lithium, a carbon-based material, an alloy-based material, or the like can be used.

Lithium is preferable because of its low redox potential (3.045 V lower than that of a standard hydrogen electrode) and a high specific capacity per unit weight and per unit volume (3860 mAh/g and 2062 $mAh/cm^3$).

Examples of the carbon-based material include graphite, graphitizing carbon (soft carbon), non-graphitizing carbon (hard carbon), a carbon nanotube, graphene, carbon black, and the like.

Examples of the graphite include artificial graphite such as meso-carbon microbeads (MCMB), coke-based artificial graphite, or pitch-based artificial graphite and natural graphite such as spherical natural graphite.

Graphite has a low potential substantially equal to that of lithium (0.1 V to 0.3 V vs. $Li/Li^+$) when lithium ions are intercalated into the graphite (while a lithium-graphite intercalation compound is formed). For this reason, a lithium-ion secondary battery can have a high operating voltage. In addition, graphite is preferable because of its advantages such as a relatively high capacity per unit volume, small volume expansion, low cost, and safety greater than that of lithium.

For the negative electrode active material, an alloy-based material that enables charge-discharge reactions by an alloying reaction and a dealloying reaction with lithium can be used. In the case where carrier ions are lithium ions, a material containing at least one of Al, Si, Ge, Sn, Pb, Sb, Bi, Ag, Au, Zn, Cd, In, Ga, and the like can be used as such an alloy-based material, for example. Such elements have a higher capacity than carbon. In particular, silicon has a significantly high theoretical capacity of 4200 mAh/g. For this reason, silicon is preferably used as the negative electrode active material. Examples of the alloy-based material using such elements include $Mg_2Si$, $Mg_2Ge$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, SbSn, and the like.

Alternatively, for the negative electrode active materials, an oxide such as SiO, SnO, $SnO_2$, titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), or molybdenum oxide ($MoO_2$) can be used. Note that SiO refers to the powder of a silicon oxide including a silicon-rich portion and can also be referred to as $SiO_y$ (2>y>0). Examples of SiO include a material containing one or more of $Si_2O_3$, $Si_3O_4$, and $Si_2O$ and a mixture of Si powder and silicon dioxide ($SiO_2$). Furthermore, SiO may contain another element (e.g., carbon, nitrogen, iron, aluminum, copper, titanium, calcium, and manganese). In other words, SiO refers to a colored material containing two or more of single crystal silicon, amorphous silicon, polycrystalline silicon, $Si_2O_3$, $Si_3O_4$, $Si_2O$, and $SiO_2$. Thus, SiO can be distinguished from $SiO_x$ (x is 2 or more), which is clear and colorless or white. Note that in the case where a secondary battery is fabricated using SiO as a material thereof and the SiO is oxidized because of repeated charge and discharge cycles, SiO is changed into $SiO_2$ in some cases.

Still alternatively, for the negative electrode active materials, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/cm³).

A nitride containing lithium and a transition metal is preferably used, in which case lithium ions are contained in the negative electrode active materials and thus the negative electrode active materials can be used in combination with a material for a positive electrode active material that does not contain lithium ions, such as $V_2O_5$ or $Cr_3O_8$. In the case of using a material containing lithium ions as a positive electrode active material, the nitride containing lithium and a transition metal can be used for the negative electrode active material by extracting the lithium ions contained in the positive electrode active material in advance.

Alternatively, a material that causes a conversion reaction can be used for the negative electrode active materials; for example, a transition metal oxide that does not cause an alloy reaction with lithium, such as cobalt oxide (CoO), nickel oxide (NiO), and iron oxide (FeO), may be used. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$. Note that any of the fluorides can be used as a positive electrode active material because of its high potential.

The negative electrode active material layer 19 may further include a binder for increasing adhesion of active materials, a conductive additive for increasing the conductivity of the negative electrode active material layer 19, and the like in addition to the above negative electrode active materials.

In the secondary battery, for example, the separator 13 has a thickness of approximately 25 μm; the positive electrode current collector 12 has a thickness of approximately 20 μm to 40 μm; the positive electrode active material layer 18 has a thickness of approximately 100 μm; the negative electrode active material layer 19 has a thickness of approximately 100 μm; and the negative electrode current collector 14 has a thickness of approximately 18 μm to 40 μm.

FIG. 1 is a schematic perspective view illustrating a fabricating apparatus 1000. The fabricating apparatus 1000 includes a container 1001, a cover 1002, an outlet 1003, a stirring means 1004, an introduction tube 1005, an electrode 1006 to be treated, an electrode 1007, a first cord 1008, a second cord 1009, and a control device 1010.

First, an electrolytic solution is introduced into the container in the fabricating apparatus illustrated in FIG. 1. A material with low volatility is preferably used as an electrolytic solution introduced into the container. An electrolytic solution used in a secondary battery is preferably different from that introduced into the container. As the electrolytic solution used in the secondary battery, a material with which a highly stable film is deposited on a negative electrode is used. Note that as the electrolytic solution used in the container, a material substantially the same as that to be used in the secondary battery may be used. In addition, a current collector (sheet-like electrode) of which one surface or both surfaces is/are provided with an active material layer (layers) is prepared, the cover 1002 is opened, and the sheet-like electrode that is rolled is put in the electrolytic solution in the container 1001 in the fabricating apparatus.

The put current collector (electrode 1006 to be treated) is electrically connected to a load via a holding means (e.g., a conductive fastener such as a wiring clip). The holding means is electrically connected to the control device 1010 via the first cord 1008.

The control device 1010 has at least two cord wirings. One of the cord wirings (the first cord 1008) is electrically connected to the current collector via the holding means, and the other cord wiring (the second cord 1009) is electrically connected to metal foil or a metal plate. In this embodiment, lithium foil used as the electrode 1007 and electrically connected to the other cord wiring is also put in the electrolytic solution in the container. Alternatively, a platinum electrode may be used instead of lithium foil as the electrode 1007. Still alternatively, a high-potential negative electrode of $FePO_4$, LTO, or the like that is predoped with lithium can be used as the electrode 1007.

The electrolytic solution is provided between the two cord wirings of the control device 1010. The control device 1010 adjusts the amount of current and voltage that are supplied and applied to the electrolytic solution provided between the two cord wirings, and the like to perform oxidation or reduction on the active material layer placed in the electrolytic solution.

Furthermore, the stirring means 1004 is provided in FIG. 1 to promote an electrochemical reaction (oxidation or reduction) for shortening of treatment time. The stirring means 1004 transfers an argon gas into the electrolytic solution through the introduction tube 1005 with a pump and performs stirring by utilizing formed bubbles. In the case of using an argon gas, the stirring means 1004 can be configured to make argon gas bubbles pass through a gap of the rolled electrode as well as to perform stirring. In addition, in the case of using an argon gas, certain distance is ensured between facing surfaces of the rolled electrode to facilitate release of gas components (gases on a surface of the electrode or bubbles in the electrolytic solution), such as a hydrogen gas, a carbon monoxide gas, a carbon dioxide gas, and the like generated as decomposition products of the electrolytic solution in the vicinity of the electrode and an oxygen gas, generated from the electrode, from the electrolytic solution.

An electrochemical reaction (oxidation or reduction) is caused while the electrolytic solution is stirred. After the occurrence of the electrochemical reaction, the electrode 1006 to be treated is taken out from the electrolytic solution in the container. Then, the electrode 1006 to be treated is dried and processed into a desired shape, so that a positive electrode current collector or a negative electrode current collector is formed.

Next, a lead electrode 16a and a lead electrode 16b having sealing layers 15 that are illustrated in FIG. 3C are prepared. The lead electrode 16a and the lead electrode 16b are each also referred to as a lead terminal and provided in order to lead a positive electrode or a negative electrode of a secondary battery to the outside of the exterior body 11. The lead electrode 16a is electrically connected to the positive electrode. As a material for the lead electrode 16a, a material that can be used for the positive electrode current collector, such as aluminum, can be used. The lead electrode 16b is electrically connected to the negative electrode. As a material for the lead electrode 16b, a material that can be used for the negative electrode current collector, such as copper, can be used.

Then, the lead electrode 16a is electrically connected to a protruding portion of the positive electrode current collector 12 by ultrasonic welding or the like. The lead electrode 16b is electrically connected to a protruding portion of the negative electrode current collector 14 by ultrasonic welding or the like.

Then, two sides of the exterior body 11 are sealed by thermocompression bonding, and one side is left open for introduction of an electrolytic solution. In thermocompression bonding, the sealing layers 15 provided over the lead electrodes are also melted, thereby fixing the lead electrodes and the exterior body 11 to each other. After that, in a reduced-pressure atmosphere or an inert atmosphere, a desired amount of electrolytic solution is introduced to the inside of the exterior body 11 in the form of a bag.

A stack formed of a positive electrode, a separator 13, and a negative electrode is packed in a region surrounded by an exterior body 11 having an opening, the electrolytic solution 20 is introduced into the region surrounded by the exterior body 11, and the opening of the exterior body is closed. To close the opening of the exterior body, lastly, the side of the film that has not been subjected to thermocompression bonding and is left open is sealed by thermocompression bonding.

Figure 3D:
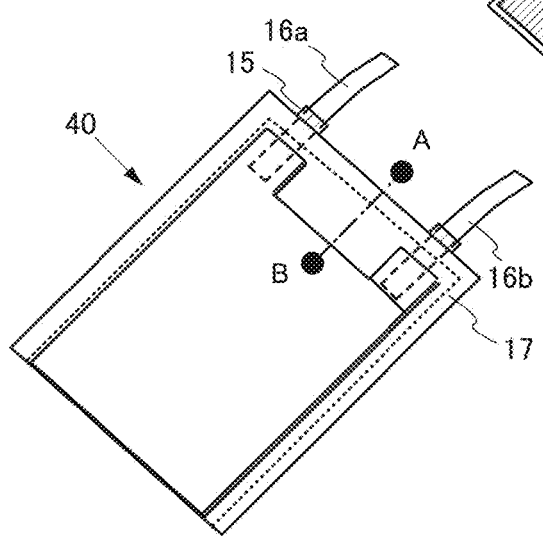

In this manner, a secondary battery 40 illustrated in FIG. 3D can be fabricated. FIG. 3E illustrates a cross section along chain line A-B in FIG. 3D. An edge region indicated in FIG. 3D is a thermocompression-bonded region 17.

As illustrated in FIG. 3E, an end portion of the secondary battery 40 is sealed with an adhesive layer 30, and the other portion is provided with an electrolytic solution 20. The adhesive layer 30 is a solid obtained in such a manner that part of the exterior body 11 is melted by thermocompression bonding and then cooled.

Here, a current flow in charging a secondary battery will be described with reference to FIG. 3F. When a secondary battery using lithium is regarded as a closed circuit, lithium ions transfer and a current flows in the same direction. Note that in the secondary battery using lithium, an anode and a cathode change places in charge and discharge, and an oxidation reaction and a reduction reaction occur on the corresponding sides; hence, an electrode with a high redox potential is called a positive electrode and an electrode with a low redox potential is called a negative electrode. For this reason, in this specification, the positive electrode is referred to as a "positive electrode" and the negative electrode is referred to as a "negative electrode" in all the cases where charge is performed, discharge is performed, a reverse pulse current is supplied, and a charging current is supplied. The use of the terms "anode" and "cathode" related to an oxidation reaction and a reduction reaction might cause confusion because the anode and the cathode change places at the time of charging and discharging. Thus, the terms "anode" and "cathode" are not used in this specification. If the term "anode" or "cathode" is used, it should be mentioned that the anode or the cathode is which of the one at the time of charging or the one at the time of discharging and corresponds to which of a positive electrode or a negative electrode.

Figure 3F:
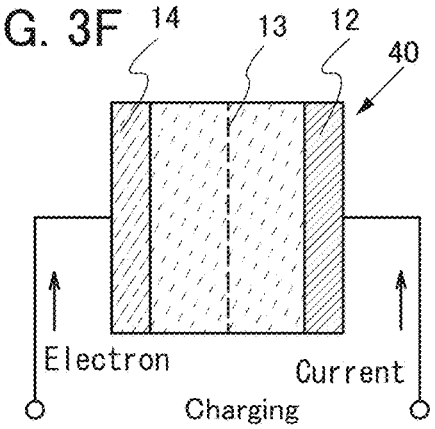
Figure 3E:
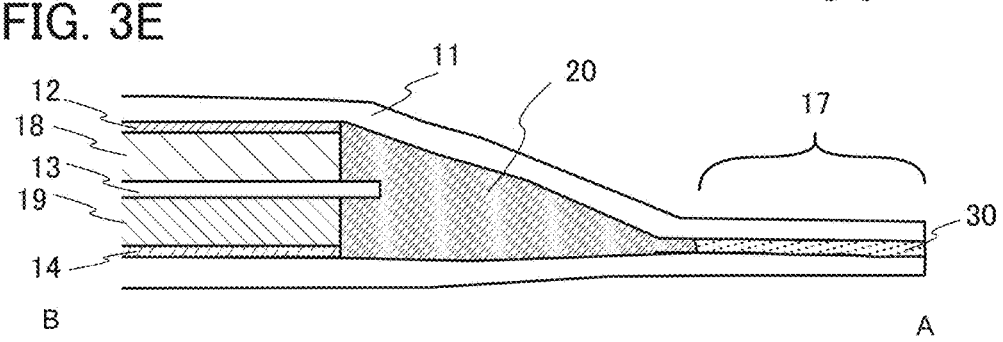

Two terminals in FIG. 3F are connected to a charger, and a secondary battery 40 is charged. As the charge of the secondary battery 40 proceeds, a potential difference between electrodes increases. The direction of a flow of a charging current is the direction in which a current flows in FIG. 3F. That is, the current flows from one terminal outside the secondary battery 40 to the positive electrode current collector 12, flows from the positive electrode current collector 12 to the negative electrode current collector 14 in the secondary battery 40, and flows from the negative electrode current collector 14 to the other terminal outside the secondary battery 40.

Although an example of a small battery used in a portable information terminal or the like is described in this embodiment, one embodiment of the present invention is not particularly limited to this example. Application to a large battery provided in a vehicle or the like is also possible.

(Embodiment 2)

In this embodiment, an example of a fabricating apparatus different from that in Embodiment 1 in the positional relation of the stirring means 1004, the electrode 1007, and the electrode 1006 to be treated, and the like will be described. Note that in FIG. 2, components that are the same as those in FIG. 1 described in Embodiment 1 are denoted by the common reference numerals.

Figure 2:
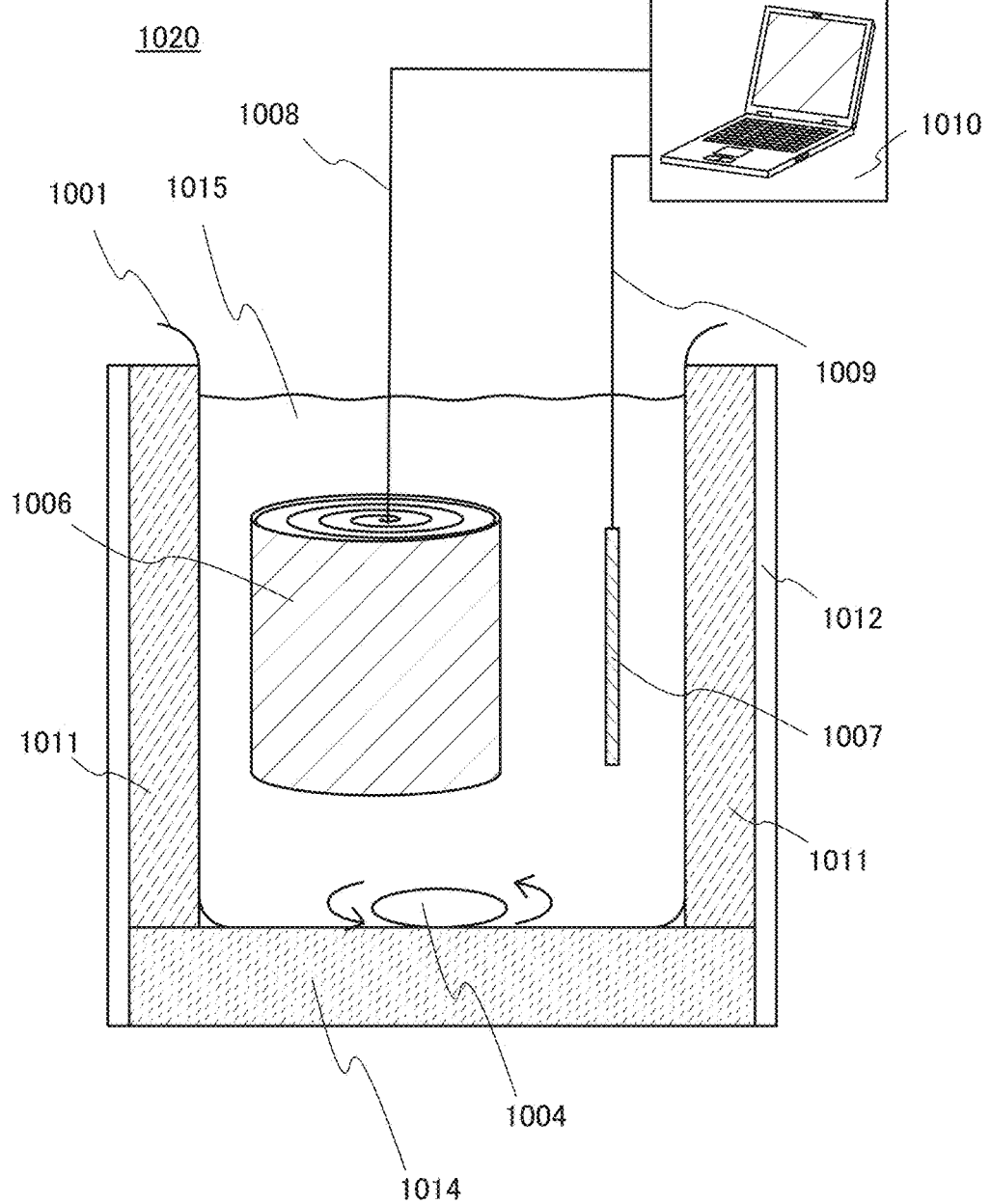
FIG. 2 is an example of a schematic cross-sectional view of a fabricating apparatus of one embodiment of the present invention.

FIG. 2 is a schematic cross-sectional view illustrating a fabricating apparatus 1020 including the container 1001, the stirring means 1004, the electrode 1006 to be treated, the electrode 1007, a plastic container 1012 in which the components are provided, the first cord 1008, the second cord 1009, and the control device 1010.

In FIG. 2, a magnetic stirrer is used as the stirring means 1004, and a device incorporated in a stand 1014 rotates the magnetic stirrer in the container 1001. In addition, a heater 1011 is provided to heat an electrolytic solution 1015 in the container.

The fabricating apparatus 1020 is configured to cause an electrochemical reaction (oxidation or reduction) in a nitrogen atmosphere or an argon atmosphere.

In the case where a batch-type apparatus in which more than one electrode 1006 to be treated is put in the electrolytic solution 1015 to cause an electrochemical reaction is employed, a large container is used, and a set of the electrode 1007, the first cord 1008, the second cord 1009, and the control device 1010 is prepared for each of the electrodes 1006 to be treated. In that case, one electrolytic solution, one container, one heater, and one stirring means can be used for the batch-type apparatus.

This embodiment can be freely combined with Embodiment 1. For example, bubbles may be generated by introducing an argon gas into the electrolytic solution 1015 while rotating the magnetic stirrer put in the container in the apparatus illustrated in FIG. 2. This can promote an electrochemical reaction, which enables short-time oxidation treatment and reduction treatment.

(Embodiment 3)

Figure 4A:
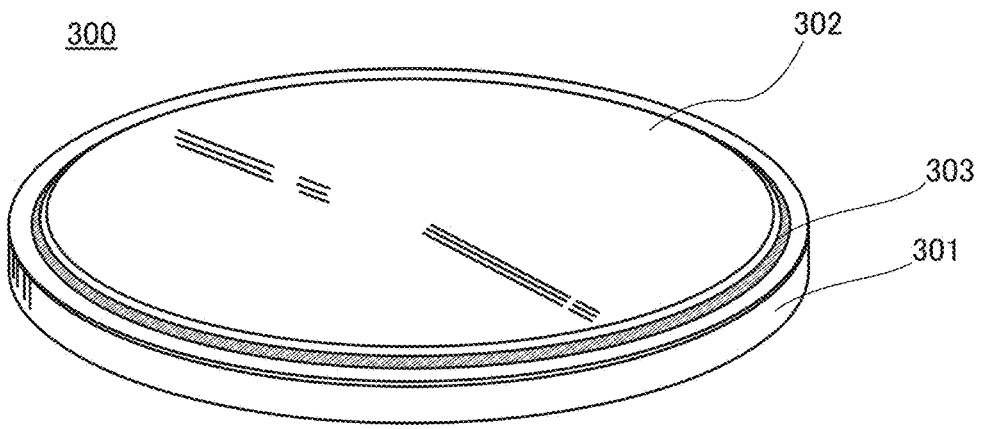
FIGS. 4A and 4B illustrate coin-type secondary batteries.
Figure 4B:
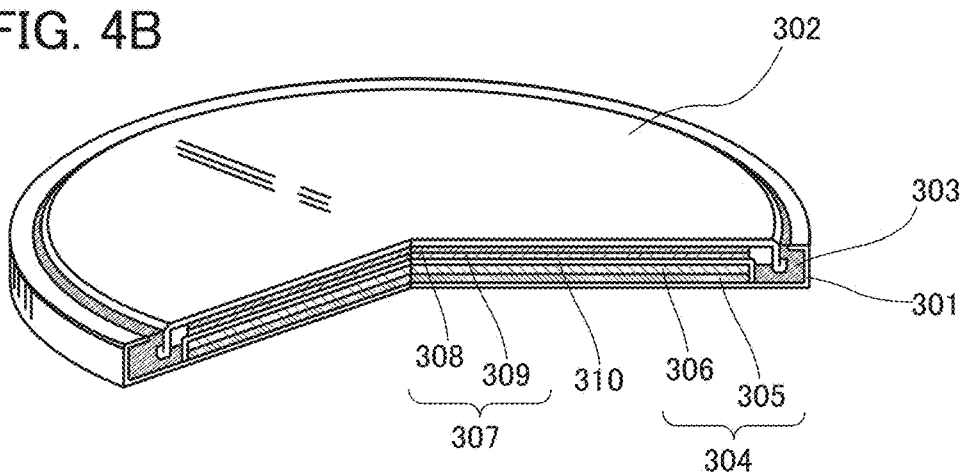

FIG. 4A is an external view of a coin-type (single-layer flat type) storage battery, and FIG. 4B is a cross-sectional view thereof.

In a coin-type storage battery 300, a positive electrode can 301 doubling as a positive electrode terminal and a negative electrode can 302 doubling as a negative electrode terminal are insulated from each other and sealed by a gasket 303 made of polypropylene or the like. A positive electrode 304 includes a positive electrode current collector 305 and a positive electrode active material layer 306 provided in contact with the positive electrode current collector 305. The positive electrode active material layer 306 may further include a binder for increasing adhesion of positive electrode active materials, a conductive additive for increasing the conductivity of the positive electrode active material layer, and the like in addition to the active materials. As the conductive additive, a material that has a large specific surface area is preferably used; for example, acetylene black (AB) can be used. Alternatively, a carbon material such as a carbon nanotube, graphene, or fullerene can be used.

A negative electrode 307 includes a negative electrode current collector 308 and a negative electrode active material layer 309 provided in contact with the negative electrode current collector 308. The negative electrode active material layer 309 may further include a binder for increasing adhesion of negative electrode active materials, a conductive additive for increasing the conductivity of the negative electrode active material layer, and the like in addition to the negative electrode active materials. A separator 310 and an electrolyte (not illustrated) are provided between the positive electrode active material layer 306 and the negative electrode active material layer 309.

Any of the materials described in Embodiment 1 is used as a negative electrode active material in the negative electrode active material layer 309. Before a battery is assembled, oxidation treatment and reduction treatment are performed on the negative electrode 307 in an electrolytic solution with the use of the apparatus described in Embodiment 1 or 2.

Any of the materials for the current collectors that are described in Embodiment 1 is used for the current collectors such as the positive electrode current collector 305 and the negative electrode current collector 308.

For the positive electrode active material layer 306, a material into and from which lithium ions can be inserted and extracted can be used. For example, any of the materials for the positive electrode active material layer that are described in Embodiment 1 is used. Before a battery is assembled, oxidation treatment and reduction treatment are performed on the positive electrode 304 in an electrolytic solution with the use of the apparatus described in Embodiment 1 or 2.

As the separator 310, an insulator such as cellulose (paper), polyethylene, and polypropylene with pores can be used.

As an electrolyte of an electrolytic solution, a material that contains carrier ions is used. Typical examples of the electrolyte are lithium salts such as $LiPF_6$, $LiClO_4$, $LiAsF_6$, $LiBF_4$, $LiCF_3SO_3$, $Li(CF_3SO_2)_2N$, and $Li(C_2F_5SO_2)_2N$. One of these electrolytes may be used alone, or two or more of them may be used in an appropriate combination and in an appropriate ratio.

Note that when carrier ions are alkali metal ions other than lithium ions, or alkaline-earth metal ions, instead of lithium in the above lithium salts, an alkali metal (e.g., sodium and potassium), an alkaline-earth metal (e.g., calcium, strontium, barium, beryllium, and magnesium) may be used for the electrolyte.

As a solvent of the electrolytic solution, a material with the carrier ion mobility is used. As the solvent of the electrolytic solution, an aprotic organic solvent is preferably used. Typical examples of aprotic organic solvents include EC, propylene carbonate, dimethyl carbonate, DEC, γ-butyrolactone, acetonitrile, dimethoxyethane, tetrahydrofuran, and the like, and one or more of these materials can be used. When a gelled high-molecular material is used as the solvent of the electrolytic solution, safety against liquid leakage and the like is improved. Furthermore, the storage battery can be thinner and more lightweight. Typical examples of gelled high-molecular materials include a silicone gel, an acrylic gel, an acrylonitrile gel, a polyethylene oxide gel, a polypropylene oxide gel, a fluorine-based polymer gel, and the like. Alternatively, the use of one or more kinds of ionic liquids (room temperature molten salts) which have features of non-flammability and non-volatility as a solvent of the electrolytic solution can prevent the storage battery from exploding or catching fire even when the storage battery internally shorts out or the internal temperature increases owing to overcharging and others.

For the positive electrode can 301 and the negative electrode can 302, a metal having a corrosion-resistant property to an electrolytic solution, such as nickel, aluminum, or titanium, an alloy of such a metal, or an alloy of such a metal and another metal (e.g., stainless steel or the like) can be used. Alternatively, the positive electrode can 301 and the negative electrode can 302 are preferably covered with nickel, aluminum, or the like in order to prevent corrosion due to the electrolytic solution. The positive electrode can 301 and the negative electrode can 302 are electrically connected to the positive electrode 304 and the negative electrode 307, respectively.

The negative electrode 307, the positive electrode 304, and the separator 310 are immersed in the electrolytic solution. Then, as illustrated in FIG. 4B, the positive electrode 304, the separator 310, the negative electrode 307, and the negative electrode can 302 are stacked in this order with the positive electrode can 301 positioned at the bottom, and the positive electrode can 301 and the negative electrode can 302 are subjected to pressure bonding with the gasket 303 interposed therebetween. In such a manner, the coin-type storage battery 300 can be manufactured.

Figure 4C:
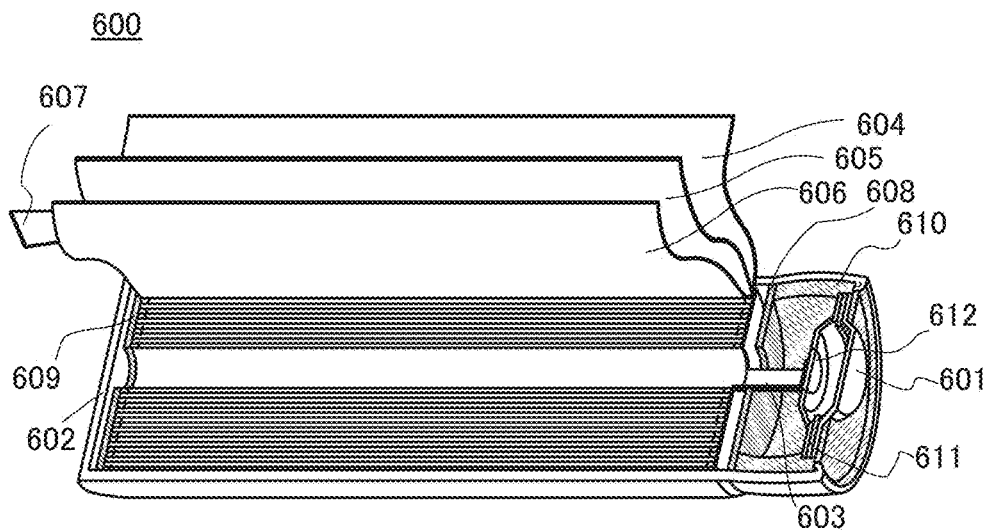
FIG. 4C illustrates a cylindrical secondary battery.

FIG. 4C illustrates an example of a cylindrical storage battery. FIG. 4C is a schematic cross-sectional view of the cylindrical storage battery.

The cylindrical storage battery 600 includes a positive electrode cap (battery cap) 601 and a battery can (outer can) 602. The positive electrode cap 601 and the battery can 602 are insulated from each other by a gasket (insulating gasket) 610.

FIG. 4C is a diagram schematically illustrating a cross section of the cylindrical storage battery. Inside the battery can 602 having a hollow cylindrical shape, a battery element in which a strip-like positive electrode 604 and a strip-like negative electrode 606 are wound with a stripe-like separator 605 interposed therebetween is provided. Although not illustrated, the battery element is wound around a center pin.

One end of the battery can 602 is close and the other end thereof is open. For the battery can 602, a metal having a corrosion-resistant property to an electrolytic solution, such as nickel, aluminum, or titanium, an alloy of such a metal, or an alloy of such a metal and another metal (e.g., stainless steel or the like) can be used. Alternatively, the battery can 602 is preferably covered with nickel, aluminum, or the like in order to prevent corrosion due to the electrolytic solution. Inside the battery can 602, the battery element in which the positive electrode, the negative electrode, and the separator are wound is provided between a pair of insulating plates 608 and 609 that face each other. Furthermore, a nonaqueous electrolytic solution (not illustrated) is injected inside the battery can 602 provided with the battery element. As the nonaqueous electrolytic solution, a nonaqueous electrolytic solution that is similar to those of the coin-type storage battery and a laminate storage battery can be used.

Although the positive electrode 604 and the negative electrode 606 can be formed in a manner similar to that of the positive electrode and the negative electrode of the coin-type storage battery described above, the difference lies in that, since the positive electrode and the negative electrode of the cylindrical storage battery are wound, active materials are formed on both sides of the current collectors. A positive electrode terminal (positive electrode current collecting lead) 603 is connected to the positive electrode 604, and a negative electrode terminal (negative electrode current collecting lead) 607 is connected to the negative electrode 606. Both the positive electrode terminal 603 and the negative electrode terminal 607 can be formed using a metal material such as aluminum. The positive electrode terminal 603 and the negative electrode terminal 607 are resistance-welded to a safety valve mechanism 612 and the bottom of the battery can 602, respectively. The safety valve mechanism 612 is electrically connected to the positive electrode cap 601 through a positive temperature coefficient (PTC) element 611. The safety valve mechanism 612 cuts off electrical connection between the positive electrode cap 601 and the positive electrode 604 when the internal pressure of the battery exceeds a predetermined threshold value. The PTC element 611, which serves as a thermally sensitive resistor whose resistance increases as temperature rises, limits the amount of current by increasing the resistance, in order to prevent abnormal heat generation. Note that barium titanate ($BaTiO_3$)-based semiconductor ceramic can be used for the PTC element.

Note that in this embodiment, the coin-type storage battery and the cylindrical storage battery are given as examples of the storage battery; however, any of storage batteries with a variety of shapes, such as a sealed storage battery and a square-type storage battery, can be used. Furthermore, a structure in which a plurality of positive electrodes, a plurality of negative electrodes, and a plurality of separators are stacked or wound may be employed.

This embodiment can be combined with Embodiment 1 or 2.

EXAMPLE 1

Figure 6:
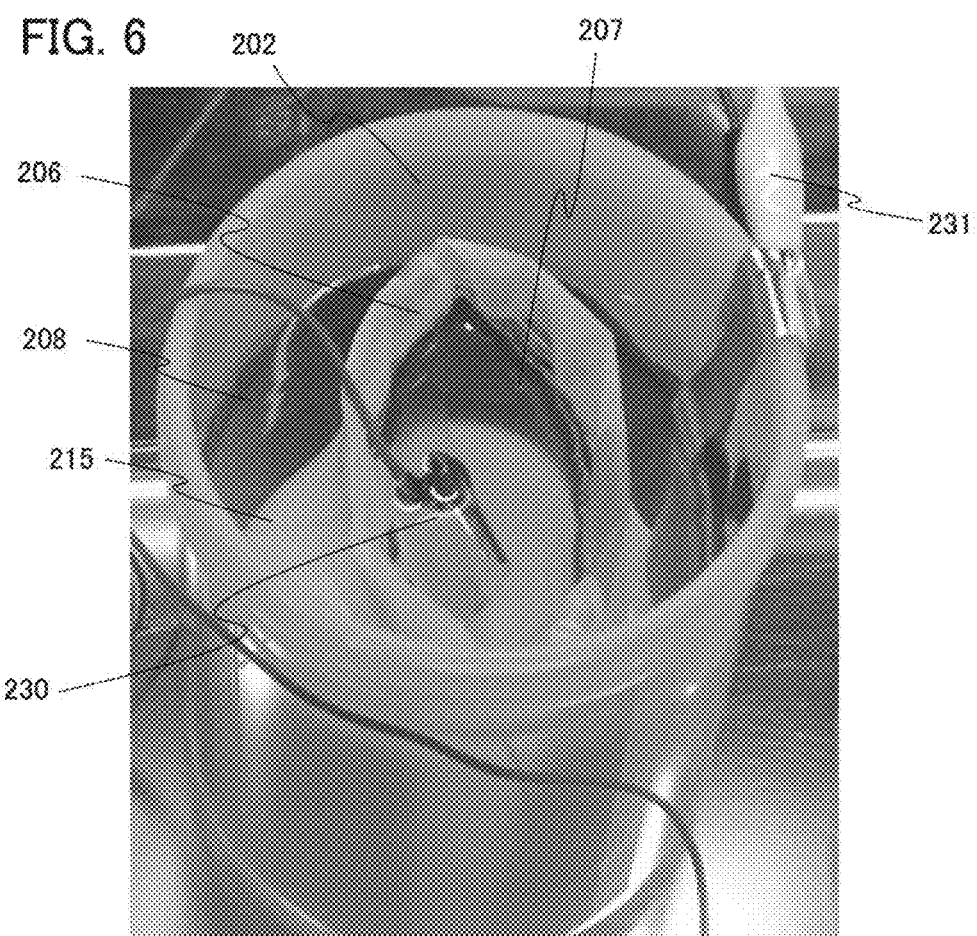
FIG. 6 is a photograph of a fabricating apparatus of one embodiment of the present invention.

In this example, a treatment apparatus illustrated in FIG. 6 was fabricated based on an apparatus design conceptual diagram in FIG. 5. Results obtained by modifying an electrode using the treatment apparatus in FIG. 6 will be described below.

FIG. 5 is the conceptual diagram of the treatment apparatus. An electrolytic solution 215 is introduced into a container 202, and lithium 207, a separator 206 that surrounds the lithium 207, and a metal film 208 serving as a current collector between the separator 206 and the container 202 are further positioned. Note that the metal film 208 is provided with a positive electrode active material layer or a negative electrode active material layer.

As illustrated in FIG. 5, a potential difference is generated between the lithium 207 and the metal film 208 to apply a load to the positive electrode active material layer or the negative electrode active material layer, whereby the active material layer is modified or degassed.

FIG. 6 is a photograph of an actually fabricated treatment apparatus that is seen from above the container. Components in FIG. 6 that are the same as those in FIG. 5 are denoted by the common reference numerals. Note that in FIG. 6, lithium in the form of metal foil is connected to a load using a wiring clip 230. The separator 206 is provided so as to surround the metal foil. The metal film 208 is connected to a load using a wiring clip 231 outside the container 202.

As a comparative example, a coin-type half cell using SiO, which is a material with low initial charge and discharge efficiency, as a negative electrode active material was fabricated, and the initial charge and discharge efficiency thereof was measured to be 71%.

Note that SiO refers to the powder of a silicon oxide including a silicon-rich portion and can also be referred to as $SiO_y$ (2>y>0). Examples of SiO include a material containing one or more of $Si_2O_3$, $Si_3O_4$, and $Si_2O$ and a mixture of Si powder and silicon dioxide ($SiO_2$). Furthermore, SiO may contain another element (e.g., carbon, nitrogen, iron, aluminum, copper, titanium, calcium, and manganese). In other words, SiO refers to a colored material containing two or more of single crystal silicon, amorphous silicon, polycrystalline silicon, $Si_2O_3$, $Si_3O_4$, $Si_2O$, and $SiO_2$. Thus, SiO can be distinguished from $SiO_x$ (x is 2 or more), which is clear and colorless or white. Note that in the case where a secondary battery is fabricated using SiO as a material thereof and the SiO is oxidized because of repeated charge and discharge cycles, SiO is changed into $SiO_2$ in some cases.

The half cell includes lithium foil as one electrode, polypropylene and glass fiber filter paper as a separator, and an electrolytic solution containing $LiPF_6$ as a salt and a mixed solvent containing ethylene carbonate and diethylene carbonate at a ratio of 3:7, which is an aprotic organic solvent.

The conditions for measurement of the charge and discharge characteristics of the half cell at room temperature (25° C.) were constant current/constant voltage (CCCV) discharge (0.2 C, 0.01 V, the minimum value: 0.01 C) and constant current (CC) charge (0.2 C, 1.5 V).

A sample including a negative electrode active material layer that contained SiO as a negative electrode active material and was formed over a metal film serving as a current collector was subjected to treatment using the treatment apparatus illustrated in FIG. 6 so that a film containing $Li_4SiO_4$ was formed on the surface of the negative electrode active material. The condition for treatment using the treatment apparatus was CCCV discharge (0.05 C, 0.4 V, the maximum value: 700 mAh/g). The initial charge and discharge efficiency of the sample half cell was measured to be 90%.

It was found from these results that the sample previously subjected to treatment using the treatment apparatus in FIG. 6 (the initial charge and discharge capacity: 90%) was more excellent than the comparative sample not subjected to treatment using the treatment apparatus in FIG. 6 (the initial charge and discharge capacity: 71%).

The initial charge and discharge efficiency refers to the ratio of the initial discharge capacity to the initial charge capacity. The initial discharge capacity refers to discharge capacity in the initial charge and discharge cycle. The initial charge and discharge efficiency (%) is the proportion of electric power capacity (Ahr) at the time of discharge to electric power capacity at the time of charge. Here, the initial charge and discharge efficiency is calculated from the charge and discharge curves obtained in the case where constant current discharge is performed until the voltage falls to 0.01 V, the constant-voltage state is maintained at 0.01 V until the current value becomes less than 0.01 C, the half cell is left in the open-circuit state for an hour, and then the half cell is discharged.

EXAMPLE 2

In this example, a current collector provided with a positive electrode active material was subjected to treatment using the apparatus illustrated in FIG. 6 instead of the current collector provided with the negative electrode active material that is described in Example 1, so that the positive electrode active material was modified. The obtained results will be described below.

A lithium-manganese composite oxide that is represented by a composition formula $Li_aMn_bM_cO_d$ was used as the positive electrode active material. In this example, a lithium-manganese composite oxide represented by a composition formula $Li_{1.68}Mn_{0.8062}Ni_{0.318}O_3$ refers to that formed at a ratio (molar ratio) of the amounts of raw materials of $Li_2CO_3$: $MnCO_3$: NiO=0.84:0.8062:0.318. Although this lithium-manganese composite oxide is represented by the composition formula $Li_{1.68}Mn_{0.8062}Ni_{0.318}O_3$, the composition might be different. The lithium-manganese composite oxide was coated with carbon. The thickness of a layer containing the carbon is preferably greater than or equal to 0.4 nm and less than or equal to 40 nm.

Furthermore, the average size of primary particles of the lithium-manganese composite oxide is preferably greater than or equal to 5 nm and less than or equal to 50 μm, more preferably greater than or equal to 100 nm and less than or equal to 500 nm, for example. Furthermore, the specific surface area is preferably greater than or equal to 5 m²/g and less than or equal to 15 m²/g. Furthermore, the average size of secondary particles is preferably greater than or equal to 5 μm and less than or equal to 50 μm. Note that the average particle sizes can be measured with a particle size distribution analyzer or the like using a laser diffraction and scattering method or by observation with a scanning electron microscope (SEM) or a TEM. The specific surface area can be measured by a gas adsorption method.

The current collector provided with the positive electrode active material was subjected to treatment using the apparatus illustrated in FIG. 6 so as to be degassed, which suppresses generation of a gas after fabrication of a secondary battery. The conditions for treatment using the treatment apparatus were CCCV charge (0.1 C, 4.8 V, the minimum value: 0.01 C) and CCCV discharge (0.1 C, 2 V, the minimum value: 0.01 C).

The half cell includes lithium foil as one electrode, polypropylene as a separator, and an electrolytic solution containing $LiPF_6$ as a salt and a mixed solvent of ethylene carbonate and diethylene carbonate, which is an aprotic organic solvent.

The conditions for measurement of the charge and discharge characteristics of the half cell at room temperature (25° C.) were CC charging (0.1 C and 4.8 V) and CC discharging (0.1 C and 2.0 V).

Figure 7A:
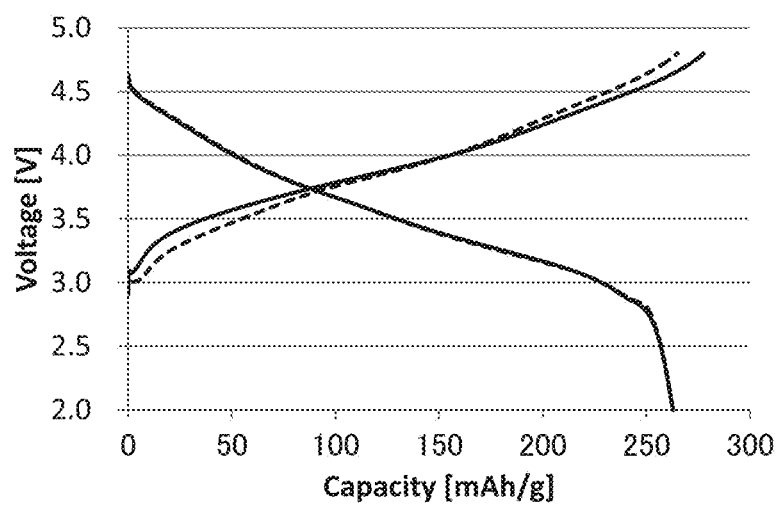
FIG. 7A is a graph showing the charge and discharge characteristics of a secondary battery of one embodiment of the present invention.

FIG. 7A shows the charge and discharge characteristics. The solid line and the dashed line indicate initial charge and discharge characteristics and second charge and discharge characteristics, respectively. FIG. 7A shows that irreversible capacity exists in initial charge and discharge. The horizontal axis represents capacity (mAh/g).

Table 1 shows measurement results of charge and discharge efficiency.

TABLE 1

| Cycle | charge capacity [mAh/g] | discharge capacity [mAh/g] | charge and discharge efficiency [%] |
|---|---|---|---|
| 1 | 277.7 | 262.9 | 94.7 |
| 2 | 265.0 | 262.9 | 99.2 |

As shown in Table 1, the initial charge and discharge efficiency was 94.7%.

Figure 7B:
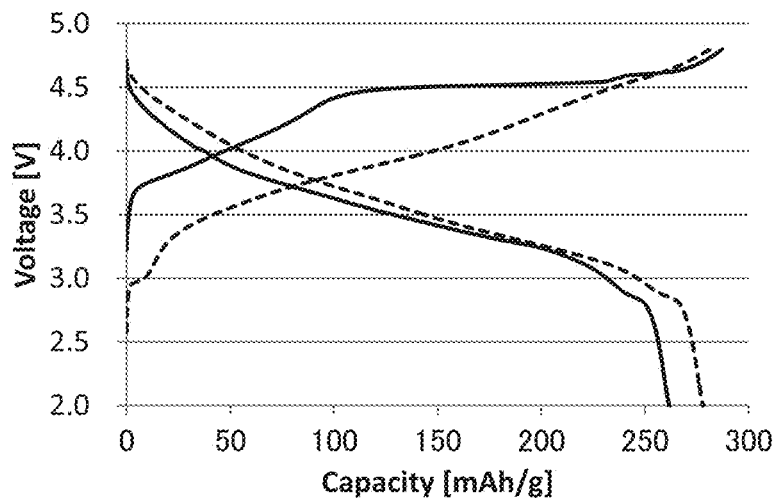
FIG. 7B is a graph showing the charge and discharge characteristics of a secondary battery of a comparative example.

In addition, a sample not subjected to treatment using the apparatus illustrated in FIG. 6 was fabricated as a comparative example, and the charge and discharge characteristics were measured. FIG. 7B shows the measurement results.

Table 2 shows measurement results of the charge and discharge efficiency of the comparative example.

TABLE 2

| | Comparative Example | | |
|---|---|---|---|
| Cycle | charge capacity [mAh/g] | discharge capacity [mAh/g] | charge and discharge efficiency [%] |
| 1 | 287.3 | 261.7 | 91.1 |
| 2 | 281.4 | 278.1 | 98.8 |

As shown in Table 2, the initial charge and discharge efficiency of the comparative example was 91.1%.

These results indicate that the use of the apparatus illustrated in FIG. 6 can improve the initial charge and discharge efficiency, reducing loss of capacity. Moreover, the charge and discharge efficiency in the second and later cycles can also be improved.

EXAMPLE 3

In this example, evaluation results of the charge and discharge characteristics of the secondary batteries fabricated in Examples 1 and 2 will be described.

First, CC charging, CCCV charging, and CC discharging will be described.

<CC Charging>

Figure 8A:
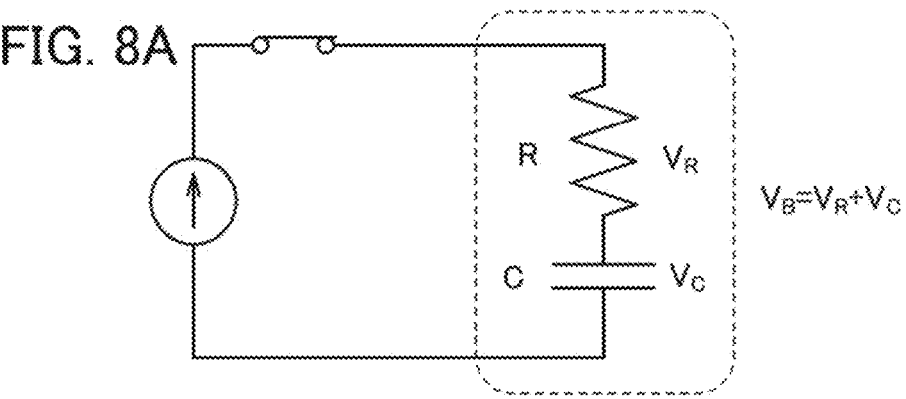
FIGS. 8A to 8C show a charge/discharge test.

CC charging will be described. CC charging is a charging method in which a constant current is made to flow to a secondary battery in the whole charging period and charging is terminated when the voltage reaches a predetermined voltage. The secondary battery is assumed to be expressed by an equivalent circuit with internal resistance R and secondary battery capacitance C as illustrated in FIG. 8A. In this case, a secondary battery voltage $V_B$ is the sum of a voltage $V_R$ applied to the internal resistance R and a voltage $V_C$ applied to the secondary battery capacitance C.

While the CC charging is performed, a switch is on as illustrated in FIG. 8A, so that a constant current I flows to the secondary battery. During the period, the current I is constant; thus, according to the Ohm's law ($V_R=R\times I$), the voltage $V_R$ applied to the internal resistance R is also constant. In contrast, the voltage $V_C$ applied to the secondary battery capacitance C increases over time. Accordingly, the secondary battery voltage $V_B$ increases over time.

Figure 8B:
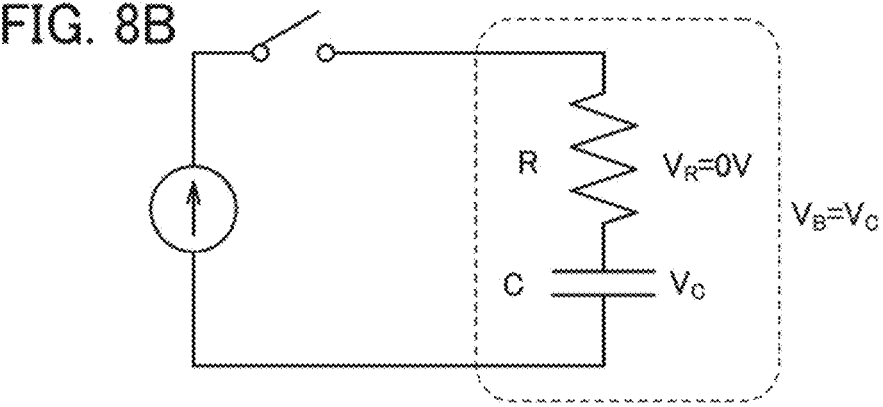

When the secondary battery voltage $V_B$ reaches a predetermined voltage, e.g., 4.1 V, the charging is terminated. On termination of the CC charging, the switch is turned off as illustrated in FIG. 8B, and the current I becomes 0. Thus, the voltage $V_R$ applied to the internal resistance R becomes 0 V. Consequently, the secondary battery voltage $V_B$ is decreased by the lost voltage drop in the internal resistance R.

Figure 8C:
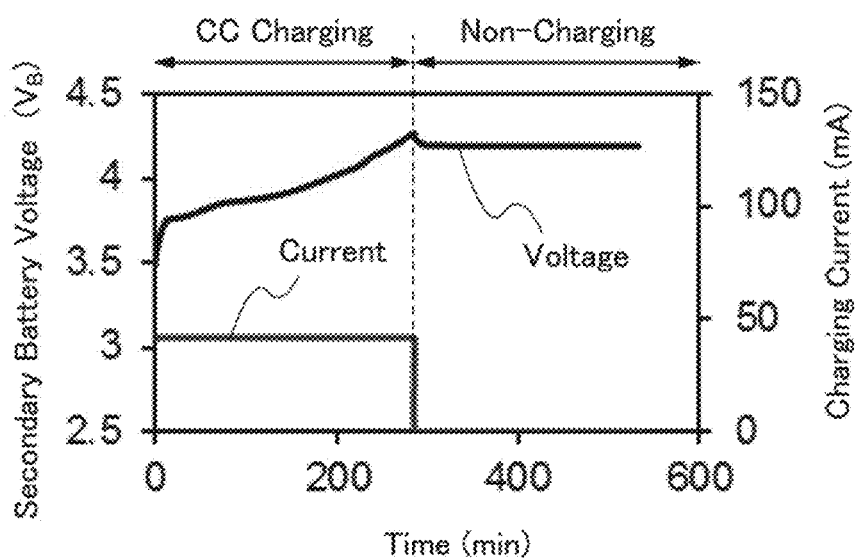

FIG. 8C shows an example of the secondary battery voltage $V_B$ and charging current while the CC charging is performed and after the CC charging is terminated. The secondary battery voltage $V_B$ increases while the CC charging is performed, and slightly decreases after the CC charging is terminated.

<CCCV Charging>

Next, CCCV charging will be described. CCCV charging is a charging method in which CC charging is performed until the voltage reaches a predetermined voltage and then CV (constant voltage) charging is performed until the amount of current flow becomes small, specifically, a termination current value.

Figure 9A:
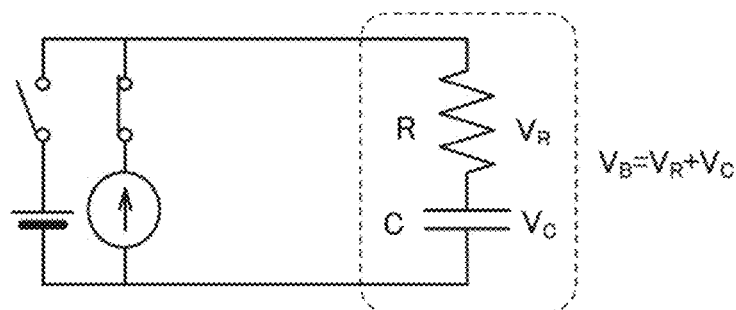
FIGS. 9A to 9D show a charge/discharge test.

While the CC charging is performed, a switch of a constant current power source is on and a switch of a constant voltage power source is off as illustrated in FIG. 9A, so that the constant current I flows to a secondary battery. During the period, the current I is constant; thus, according to the Ohm's law ($V_R=R\times I$), the voltage $V_R$ applied to the internal resistance R is also constant. In contrast, the voltage $V_C$ applied to the secondary battery capacitance C increases over time. Accordingly, the secondary battery voltage $V_B$ increases over time.

Figure 9B:
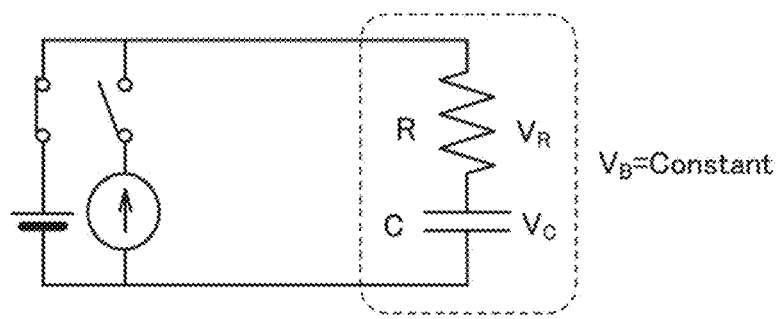

When the secondary battery voltage $V_B$ reaches a predetermined voltage, e.g., 4.1 V, switching is performed from the CC charging to the CV charging. While the CV charging is performed, the switch of the constant voltage power source is on and the switch of the constant current power source is off as illustrated in FIG. 9B; thus, the secondary battery voltage $V_B$ is constant. In contrast, the voltage $V_C$ applied to the secondary battery capacitance C increases over time. Since $V_B=V_R+V_C$ is satisfied, the voltage $V_R$ applied to the internal resistance R decreases over time. As the voltage $V_R$ applied to the internal resistance R decreases, the current I flowing to the secondary battery also decreases according to the Ohm's law ($V_R=R\times I$).

Figure 9C:
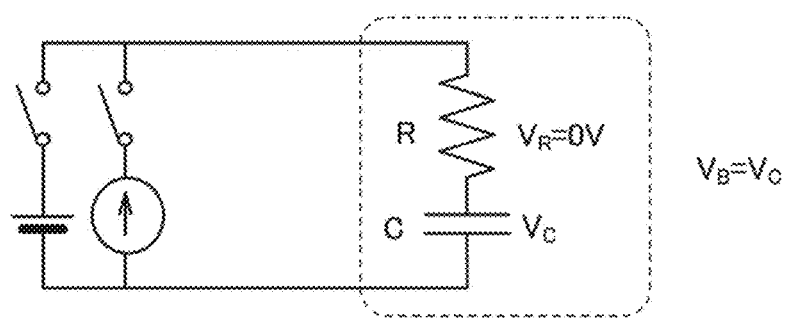

When the current I flowing to the secondary battery becomes a predetermined current, e.g., approximately 0.01 C, charging is terminated. On termination of the CCCV charging, all the switches are turned off as illustrated in FIG. 9C, so that the current I becomes 0. Accordingly, the voltage $V_R$ applied to the internal resistance R becomes 0 V. However, the voltage $V_R$ applied to the internal resistance R becomes sufficiently small by the CV charging; thus, even when a voltage drop no longer occurs in the internal resistance R, the secondary battery voltage $V_B$ hardly decreases.

Figure 9D:
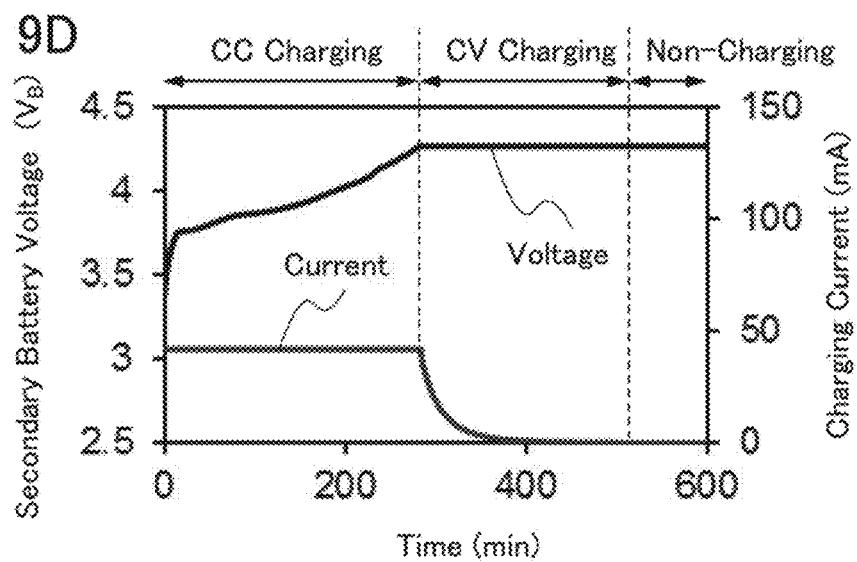

FIG. 9D shows an example of the secondary battery voltage $V_B$ and charging current while the CCCV charging is performed and after the CCCV charging is terminated. Even after the CCCV charging is terminated, the secondary battery voltage $V_B$ hardly decreases.

<CC Discharging>

Next, CC discharging will be described. CC discharging is a discharging method in which a constant current is made to flow from a secondary battery in the whole discharging period and discharging is ended when the secondary battery voltage $V_B$ reaches a predetermined voltage, e.g., 2.5 V.

Figure 10:
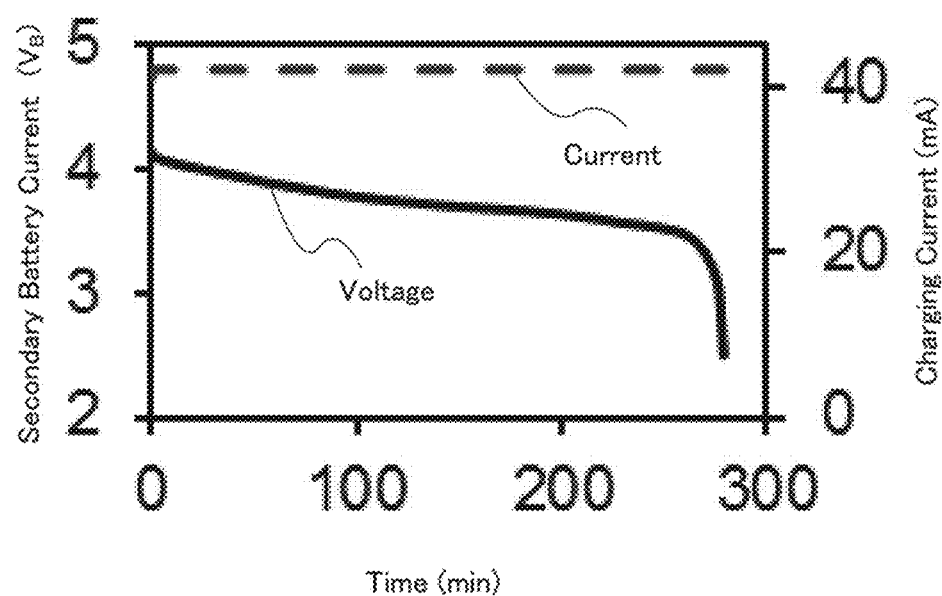
FIG. 10 shows a charge/discharge test.

FIG. 10 shows an example of the secondary battery voltage $V_B$ and charging current while the CC discharging is performed. As discharging proceeds, the secondary battery voltage $V_B$ decreases.

Next, a charge rate and a discharge rate will be described. The discharge rate refers to the relative ratio of discharging current to battery capacity and is expressed in a unit C. A current of approximately 1 C in a battery with a rated capacity X (Ah) is X A. The case where discharging is performed at a current of 2X A is rephrased as follows: discharging is performed at 2 C. The case where discharging is performed at a current of X/5 A is rephrased as follows: discharging is performed at 0.2 C. Similarly, a charge rate of 1 C indicates a current value at which a battery can be completely charged in just 1 hour by CC charging.

This application is based on Japanese Patent Application serial no. 2014-138755 filed with Japan Patent Office on Jul. 4, 2014, the entire contents of which are hereby incorporated by reference.

What is claimed is:

1. A fabricating method for a secondary battery, comprising:
   forming a first electrode including a positive electrode active material layer;
   forming a second electrode including a negative electrode active material layer;
   rolling the second electrode;
   providing the rolled second electrode into a first electrolytic solution, the rolled second electrode provided over a third electrode comprising lithium;
   performing an electrochemical reaction to the second electrode with the third electrode in the first electrolytic solution;
   packing a stack including the first electrode and the second electrode in an exterior body having an opening;
   introducing a second electrolytic solution in the exterior body; and
   closing the opening of the exterior body,
   wherein a stirring unit having discotic shape is provided between the third electrode and the rolled second electrode,
   wherein argon gas bubbles output from the stirring unit pass through a gap of the rolled second electrode in the electrochemical reaction, and
   wherein at least one of the first electrolytic solution and the second electrolytic solution contains lithium.

2. The fabricating method for a secondary battery, according to claim 1, further comprising the step of:
   taking out the second electrode from the first electrolytic solution after performing the electrochemical reaction.

3. The fabricating method for a secondary battery, according to claim 2, further comprising the step of:
   drying the second electrode after taking out the first electrode from the first electrolytic solution.

4. The fabricating method for a secondary battery, according to claim 1,
   wherein lithium foil is used as the third electrode when performing the electrochemical reaction.

5. The fabricating method for a secondary battery, according to claim 1,
   wherein the first electrolytic solution is stirred when performing the electrochemical reaction.

6. The fabricating method for a secondary battery, according to claim 1, wherein the first electrolytic solution is heated when performing the electrochemical reaction.

7. The fabricating method for a secondary battery, according to claim 1,
wherein the first electrolytic solution comprises an ionic liquid.

8. The fabricating method for a secondary battery, according to claim 1,
wherein the electrochemical reaction is performed at a pressure of approximately 0.5 atmospheres.

9. The fabricating method for a secondary battery, according to claim 1,
wherein at least one of the first electrolytic solution and the second electrolytic solution comprises $LiPF_6$, ethylene carbonate and diethylene carbonate.

10. The fabricating method for a secondary battery, according to claim 1,
wherein the lithium is $Li(CF_3SO_2)_2N$.

11. A fabricating method for a secondary battery comprising:
forming a first electrode including a positive electrode active material layer;
forming a second electrode including a negative electrode active material layer comprising silicon;
rolling the second electrode;
providing the rolled second electrode into a first electrolytic solution, the rolled second electrode provided over a third electrode comprising lithium;
performing an electrochemical reaction to the second electrode with the third electrode in the first electrolytic solution;
packing a stack including the first electrode and the second electrode in an exterior body having an opening;
introducing a second electrolytic solution in the exterior body; and
closing the opening of the exterior body,
wherein a stirring unit having discotic shape is provided between the third electrode and the rolled second electrode,
wherein argon gas bubbles output from the stirring unit pass through a gap of the rolled second electrode in the electrochemical reaction, and
wherein at least one of the first electrolytic solution and the second electrolytic solution contains lithium.

12. The fabricating method for a secondary battery, according to claim 11, further comprising the step of:
taking out the second electrode from the first electrolytic solution after performing the electrochemical reaction.

13. The fabricating method for a secondary battery, according to claim 12, further comprising the step of:
drying the second electrode after taking out the first electrode from the first electrolytic solution.

14. The fabricating method for a secondary battery, according to claim 11,
wherein lithium foil is used as the third electrode when performing the electrochemical reaction.

15. The fabricating method for a secondary battery, according to claim 11,
wherein the first electrolytic solution is stirred when performing the electrochemical reaction.

16. The fabricating method for a secondary battery, according to claim 11,
wherein the first electrolytic solution is heated when performing the electrochemical reaction.

17. The fabricating method for a secondary battery, according to claim 11,
wherein the first electrolytic solution comprises an ionic liquid.

18. The fabricating method for a secondary battery, according to claim 11,
wherein the electrochemical reaction is performed at a pressure of approximately 0.5 atmospheres.

19. The fabricating method for a secondary battery, according to claim 11,
wherein at least one of the first electrolytic solution and the second electrolytic solution comprises $LiPF_6$, ethylene carbonate and diethylene carbonate.

20. The fabricating method for a secondary battery, according to claim 11,
wherein the lithium is $Li(CF_3SO_2)_2N$.

* * * * *